March 15, 1932. C. C. ARGABRIGHT 1,849,739
CLOVER FEEDER ATTACHMENT FOR CULTIVATORS
Filed Nov. 6, 1930 3 Sheets-Sheet 1

Inventor
C. C. Argabright
By Clarence A. O'Brien
Attorney

March 15, 1932. C. C. ARGABRIGHT 1,849,739
CLOVER FEEDER ATTACHMENT FOR CULTIVATORS
Filed Nov. 6, 1930    3 Sheets-Sheet 2

Inventor
C.C.Argabright
By Clarence A. O'Brien
Attorney

March 15, 1932.   C. C. ARGABRIGHT   1,849,739
CLOVER FEEDER ATTACHMENT FOR CULTIVATORS
Filed Nov. 6, 1930   3 Sheets-Sheet 3
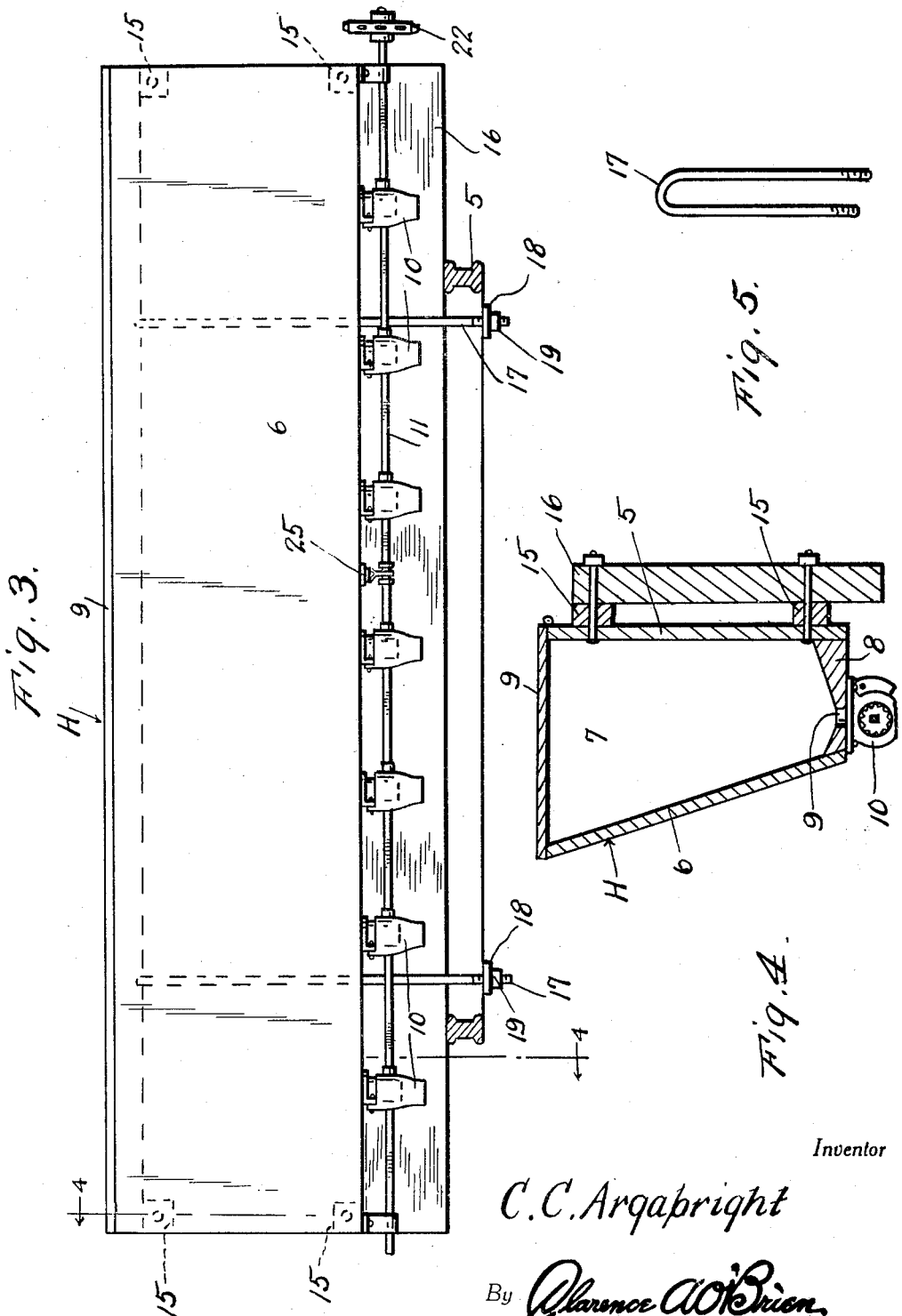
Inventor
C. C. Argabright
By Clarence A. O'Brien
Attorney Patented Mar. 15, 1932

1,849,739

UNITED STATES PATENT OFFICE

CARL C. ARGABRIGHT, OF AUBURN, NEBRASKA

CLOVER FEEDER ATTACHMENT FOR CULTIVATORS

Application filed November 6, 1930. Serial No. 493,887.

The present invention relates to an attachment for cultivators in the nature of a clover feeder whereby clover seeds may be planted simultaneously with the use of the cultivator while corn or the like is being cultivated thereby.

Objects of the invention are in the provision of an attachment of this nature which is exceedingly simple in its construction, easy to mount on the cultivator, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a vertical section taken substantially on the line 3—3 of Figure 1,

Figure 4 is a vertical section taken substantially on the line 4—4 of Figure 3, and Figure 5 is a perspective view of one of the U-bolts.

Figure 1:
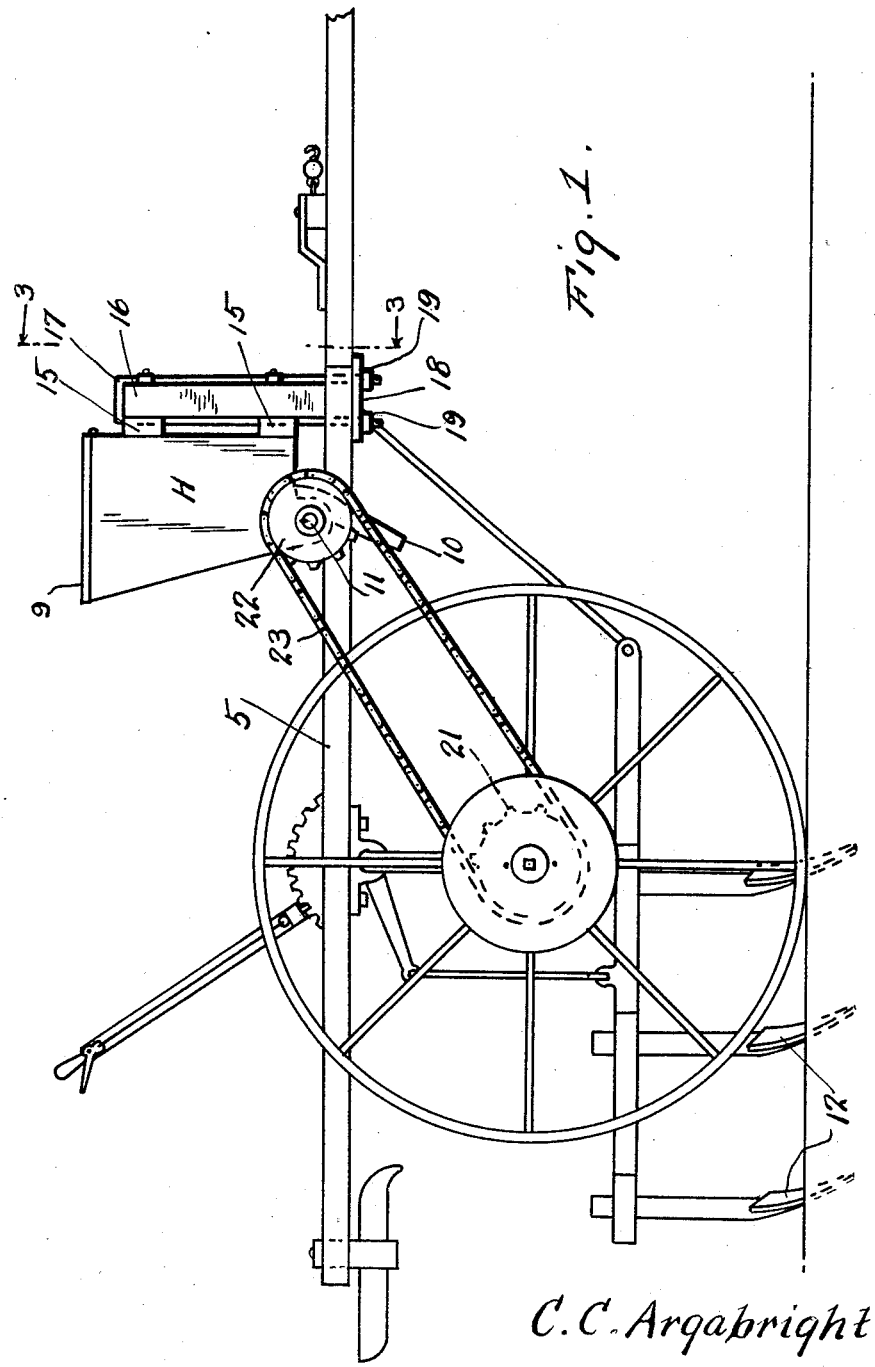
Figure 1 is a side elevation of a cultivator showing my attachment thereon.
Figure 2:
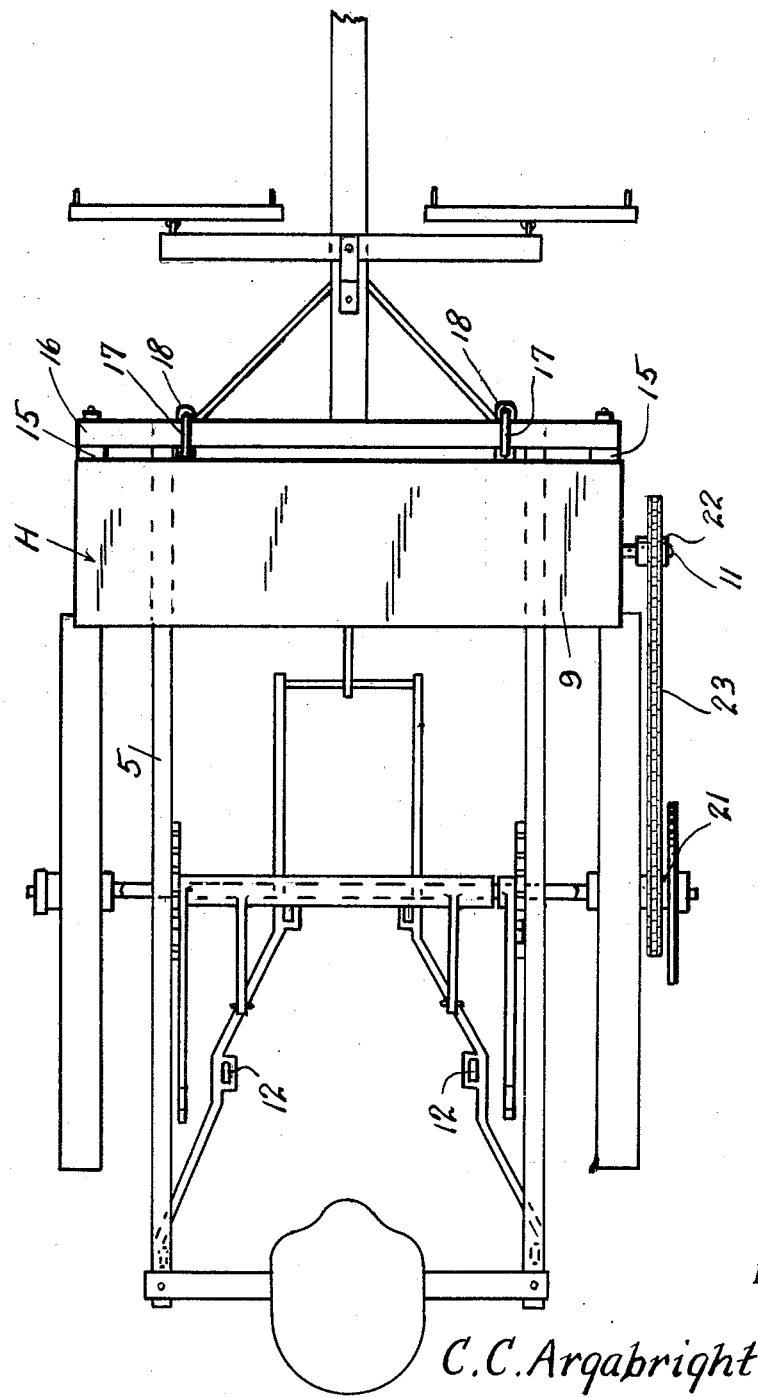
Figure 2 is a top plan view thereof.

Referring to the drawings in detail it will be seen that the numeral 5 denotes the frame of a conventional cultivator. The letter H denotes generally a feed hopper of elongated construction and includes a front wall 5, a rear wall 6, side walls 7, a bottom 8, and a hinged lid 9. The front wall and the side walls are vertically disposed while the rear wall 6 inclines downwardly and forwardly. The bottom 8 is provided with a plurality of openings 9 with feed distributing mechanism 10 depending therefrom and operable shaft 11. There is one mechanism 10 in front of each ground engaging element 12 of the cultivator.

On the front wall 5 of the hopper H are a pair of cross horizontal bars 15 fixed to a relatively large beam 16 adapted to rest across the frame 5. Inverted U-shaped bolts 17 straddle the beam 16 and extend through openings in plates 18 engaged under the frame 5 and nuts 19 are threaded on the extremities of the U-bolts thereby securely clamping the beam 16 in place on the frame and holding the feed hopper in place. Thus it will be seen that the feed hopper may be easily and quickly attached to and detached from the frame 5 of the cultivator. One of the wheels 20 of the cultivator has a sprocket 21 thereon. A sprocekt 22 is mounted on one end of the shaft 11 and a chain 23 is trained over the sprockets 21 and 22. Numeral 25 denotes a lever for shifting the shaft 11 for causing the feed dropping mechanism 10 to be operative or inoperative.

From the above detailed description it will be seen that this attachment may be placed on the cultivator and as corn or the like is being cultivated the clover seed may be thrown thereby saving time and giving a much better stand of clover than if the same is broadcast in the usual manner. By sowing this in the corn in the summer it will be ready to plow the following spring and thereby enabling the ground to be built up without the loss of the crop.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a cultivator including a pair of spaced longitudinally extending bars, an elongated feed hopper extending transversely of the cultivator frame and resting on said bars, a pair of super-imposed spacer blocks connected to each end of the front wall of the hopper, a transversely arranged beam having its lower edge resting on the bars with its rear face contacting the blocks, bolts passing through the front wall of the hopper, the blocks and said beam, U-bolts straddling the beam, plates resting against the lower edges of the bars having holes therein for receiving the ends of the U-shaped members and nuts on the ends of said U-shaped members for holding them in the plates.

In testimony whereof I affix my signature.

CARL C. ARGABRIGHT.